United States Patent
Kortschack

(10) Patent No.: US 6,506,432 B1
(45) Date of Patent: Jan. 14, 2003

(54) METHOD FOR PRODUCING AND SHAPING FOOD, SUCH AS MEAT PRODUCTS AND SAUSAGES

(76) Inventor: Fritz Kortschack, Katzwanger Steig 36a, D-14089 Berlin (DE)

( * ) Notice: Subject to any disclaimer, the term of this patent is extended or adjusted under 35 U.S.C. 154(b) by 0 days.

(21) Appl. No.: 09/622,079

(22) PCT Filed: Feb. 17, 1999

(86) PCT No.: PCT/EP99/01022

§ 371 (c)(1),
(2), (4) Date: Sep. 25, 2000

(87) PCT Pub. No.: WO99/42004

PCT Pub. Date: Aug. 26, 1999

(30) Foreign Application Priority Data

Feb. 19, 1998 (DE) ............................ 198 07 794

(51) Int. Cl.⁷ ............................. A23P 1/10; B65B 1/24
(52) U.S. Cl. ....................................... 426/414; 426/513
(58) Field of Search ................................ 426/129, 414, 426/410, 411, 513; 53/432, 510, 512, 434, 436, 440, 441, 442

(56) References Cited

U.S. PATENT DOCUMENTS 3,363,395 A * 1/1968 King ........................... 53/511
3,912,823 A * 10/1975 Kane ........................... 426/415
4,275,544 A * 6/1981 Hisazumi ..................... 53/433

FOREIGN PATENT DOCUMENTS

DE 4231093 1/1994

\* cited by examiner

*Primary Examiner*—Arthur L. Corbin
(74) *Attorney, Agent, or Firm*—Friedrich Kueffner

(57) ABSTRACT

In a method for manufacturing and forming meat and sausage products, a semi-finished meat or sausage product is brought into a foil bag or between foils and sealed under vacuum to form a filled package. The filled package is then aligned between two movable, adjustable plates, and a uniform distribution of the package contents is achieved by applying a slight pressure on the package by moving the plates against one another. A vacuum is generated in plate cavities provided in the plates upon reaching a certain plate distance or a pressure within the filled package. In this way, the foil of the package undergoes stretching within the plate cavities and a cavity wall of the plate cavities, and the semi-finished meat or sausage product assumes a surface shape of the plates.

3 Claims, No Drawings

METHOD FOR PRODUCING AND SHAPING FOOD, SUCH AS MEAT PRODUCTS AND SAUSAGES

BACKGROUND OF THE INVENTION

1. Field of the Invention

The invention relates to a method for the production and forming of food which is wrapped in foils as a protection against recontamination.

2. Description of the Related Art

It is known that e.g. sausage and meat products which are to keep for a longer period of time have to be subjected to a special treatment. Primarily scalded sausages (sausages for frying, sausage meat dumplings or the like) which are marketed unsmoked and without the use of nitrite pickling salt will only keep for a short time in the unpacked condition.

The actual latest state of the art in the production of un-packed food is described in DE 42 23 482, DE 39 11 463, and DE 43 26 688.

DE 42 23 482 explains the following method for the production of scalded sausages, meat, and meat-like products:

"The object is solved in that the fill material is filled into a sealable bag or between to foils to be joined. The bag or the foils are sealed in an air-tight manner by means of welding, permanent pressure, clipping, binding, or folding at the openings, after the entrapped air has been removed from the intermediate space of the packing by vacuumising.

In order to obtain finished products of identical size the fill material is uniformly distributed in the package. The filled and sealed package is placed between two gates adjusted to the size of the package, and by approaching the gates to the material thickness of the foils, a separation of the fill material into individual strands is achieved. The gates, together with the filled, clamped packages are heated for preserving the fill material and subsequently cooled down. Due to the fact that according to the presented method, the individual finished products are already packed in an air-tight manner after the termination of the manufacture, the risk of recontamination is precluded. Any and all flavouring substances remain in the product. The filling and packing operation which is very manpower-intensive can be fully automated. The employment of sausage skins or other wrappings is omitted."

Another method for the manufacture of scalded, unsmoked sausage, sausage meat dumplings and similar raw sausage meat products is presented in DE 39 11 463 as follows:

"The method provides for filling raw sausage meat into pre-formed (deep drawn) foils by means of a filling machine and a corresponding distribution head (rake filler).

After filling, the packages in which several raw parts (e.g. sausages for frying) are lying next to each other without contac-ting one another are covered by a further foil (lid foil), evacuated, and the foils are welded to each other (surface sealing) in such a manner that each raw part is completely wrapped. The package with the fresh sausage meat is heated, the contents are thereby preserved.

Due to the fact that according to the presented method, the individual finished products are already packed in an air-tight manner after the termination of the manufacture, the risk of recontamination is precluded. Any and all flavouring substances remain in the product. The filling and packing operation which is very manpower-intensive can be fully auto-mated. The employment of sausage skins or other wrappings is omitted."

A method for ripening and drying of raw sausages, salamis, and similar products in a water-proof form or wrapping to be vacuumised is described in DE 43 26 688 as follows:

"The raw material is prepared as usual under the supplementary addition of moisture absorbing substances and rapidly acidifying starter cultures and/or glucondeltalactone (GdL). The raw material (sausage meat, coarse meat pieces) is filled into forms or wrappings of water-proof material. Immediately after filling, the form or wrapping together with its contents is subjected to a vacuum for deaeration of the raw material. Subsequently, the wrapping or form is tightly sealed.

The desired aw (water activity) value is adjusted by the quantity of the added moisture absorbing substances. With the addition of rapidly acidifying starter cultures and/or glucondeltalactone (GdL), the required undelayed decrease of the pH value, and thus the formation of gel, is achieved. After filling the forms or wrappings, the raw sausage meat must be held at specified temperatures in accordance with the raw material composition, in order to enable the ripening process to start and continue in the desired manner. The following ripening process is conceivable:

* hold at approx. 24°–26° C. for 24 hrs;
* hold at approx. 22°–24° C. for 12 hrs; subsequently
* hold at approx. 18° C. for 48 hrs.

Subsequently, the raw material has ripened to such an extent that if can be sold as a finished product."

SUMMARY OF THE INVENTION

It is the object of the invention to specify a method according to which the processing steps of packing and preserving of food can be carried out in a simple manner, and according to which a qualitatively stable and attractive end product is generated.

This object is solved in that a specified portion of the pasty semi-finished product is injected onto a lower foil. An upper foil is drawn thereon. The upper and the lower foil are welded together at their edges in a vacuum.

DESCRIPTION OF PREFERRED EMBODIMENTS

The novel method is similar to that of DE 42 23 482. However, it differs from same in that the shaping of the foils is not exclusively effected by the pressure of the fill material inside the packages, but that the foils are stretched and drawn into the desired shape in a high and/or deep drawing machine.

The formation of folds of the foil which occurs in particular at the ends of the products by the squeezing operation upon placement of the gates, which can be observed in the method according to DE 42 23 482, is herein avoided by the previous stretching and shaping of the foil.

With the aid of this novel method, it is possible to achieve the forming of the lower foil, the upper foil as well as of both foils simultaneously. When forming the upper and the lower foil synchronously, thinner materials can be employed, because the mechanical stress on the foils is considerably reduced due to the shallow forming depth.

The novel method makes it possible to seal the superposing foils between the formed semi-finished products in a manner similar to that of DE 39 11 463. Due to the fact that—different from the application of the method according to DE 39 11 463—the foil areas which are to be welded have been in contact with fat and meat protein, a foil has to be used which allows a sealing through fat and protein films. After completion of the manufacture, this type of packing allows to withdraw the products individually. If gates are employed, as in the method according to DE 42 23 482 subsequently to the forming of the food in the high and/or deep drawing machine, packages are provided after the termination of the manufacture, which wrap several single products in one foil.

The semi-finished product can also be filled into a foil bag which is subsequently deaerated and sealed.

The packages generated in this manner are then aligned securely from above and from below between two plates. One or also both plates comprise cavities which correspond to the later shape of the finished product. The two plates are then advanced towards each other so that the semi-finished product is distributed uniformly between the foils under a slight pressure. As soon as a certain plate distance is reached or a specified pressure is built up within the packages, the air in is drawn off through the cavities of the plates. While the foils resting on the webs of the plates are not involved, the foil in the cavities is stretched and drawn to the walls of the cavities. At the same time, the fill material is caused to advance by the pressure which is built-up by the further approach of the plates and, upon the termination of this operation, is completely located in the cavities lined with the foil. In the case of a two-sided forming of the packages, the cavities of both plates must be exactly mated to each other.

Subsequently, the foil webs, as provided in the method according to DE 39 11 463 are sealed, but in the present case, by using a special foil material, through the fat and protein film.

If a sealing is not desired, the packages are clamped between two gates as are employed in the method according to DE 42 23 482, which are matched to the shape of the plate cavities.

In both cases, it is achieved that the semi-finished products are lying next to each other without contacting one another during the preservation process.

The packed semi-finished products can then be deep-frozen for intermediate storage, immediately heated and subsequently cooled-down, or processed under high pressure of approx. 500 to 1000 MPa for finishing. Raw sausage can be further processed according to the method of DE 43 26 688, or also DE 196 53 677.

Due to the fact that the semi-finished products are already packed in an air-tight manner according to the present invention, the risk of recontamination is precluded. Any and all flavouring substances remain in the product. The filling and packing operation which is very manpower-intensive can be fully automated. The employment of sausage skins or other wrappings is omitted.

What is claimed is:

1. A method for manufacturing and forming meat and sausage products, the method comprising introducing a semi-finished meat or sausage product into a foil bag or between foils and sealing the foils under vacuum to form a filled package, aligning the filled package between two movable, adjustable plates having plate cavities, moving the plates toward one another for applying a pressure on the package for uniformly distributing the semi-finished meat or sausage products, further comprising, when a predetermined pressure within the filled package has been reached, generating a vacuum in the plate cavities of the plates for stretching the foil within the plate cavities and contacting the foil with a cavity wall of the plates, and further moving the plates toward one another for shaping the meat or sausage products into the surface shape of the plates.

2. The method according to claim 1, further moving the plates toward one another until unstretched foil areas contact one another, and welding the unstretched foil areas.

3. The method according to claim 1, further moving the plates toward one another until unstretched foil areas contact one another, placing a gate having the same shape as the plate cavities against the filled package for stabilizing the semi-finished meat or sausage products until a final shape of the meat and sausage products is obtained by heating, deep-freezing, ripening, or high-pressure processing.

* * * * *